Sept. 3, 1940. A. BUCHI 2,213,202
INTERNAL COMBUSTION ENGINE
Filed July 8, 1938 3 Sheets-Sheet 2
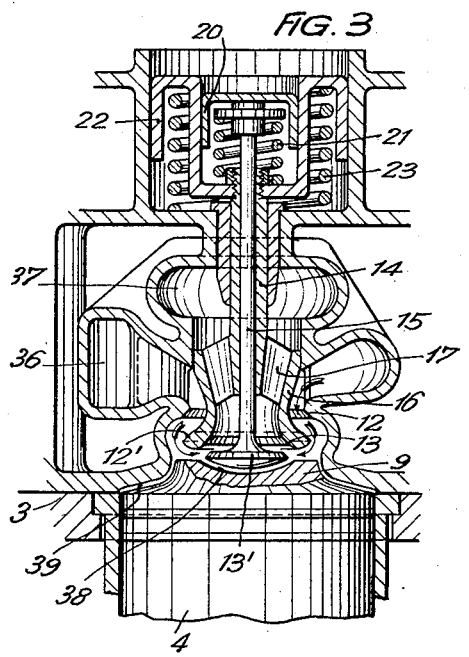
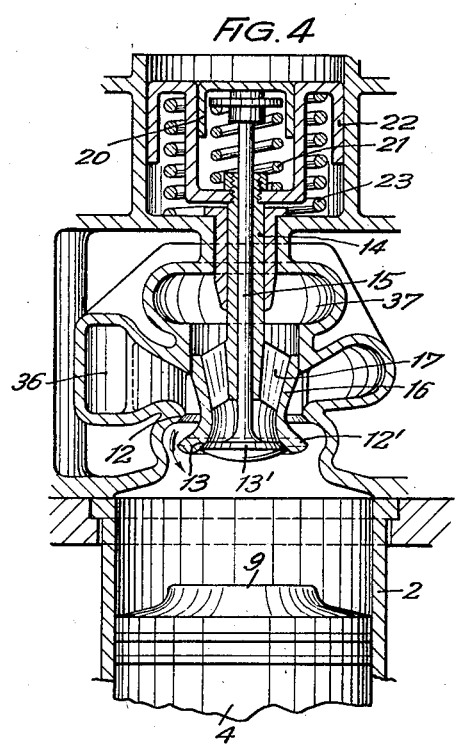
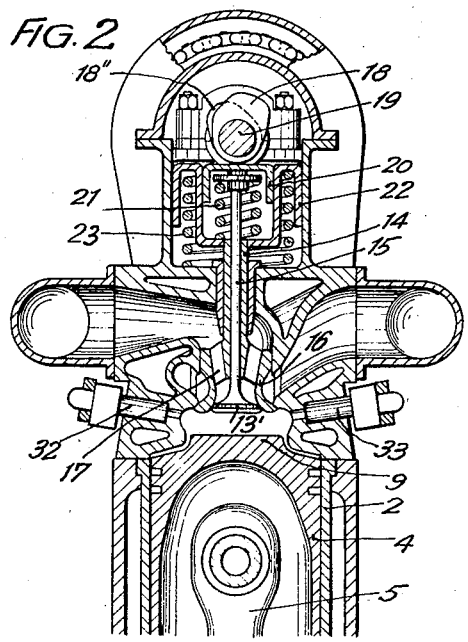
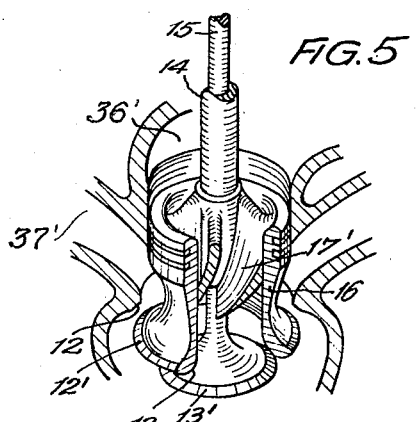
Inventor:
Alfred Büchi
by
Sommers & Young
Attys Sept. 3, 1940.  A. BUCHI  2,213,202
INTERNAL COMBUSTION ENGINE
Filed July 8, 1938  3 Sheets-Sheet 3

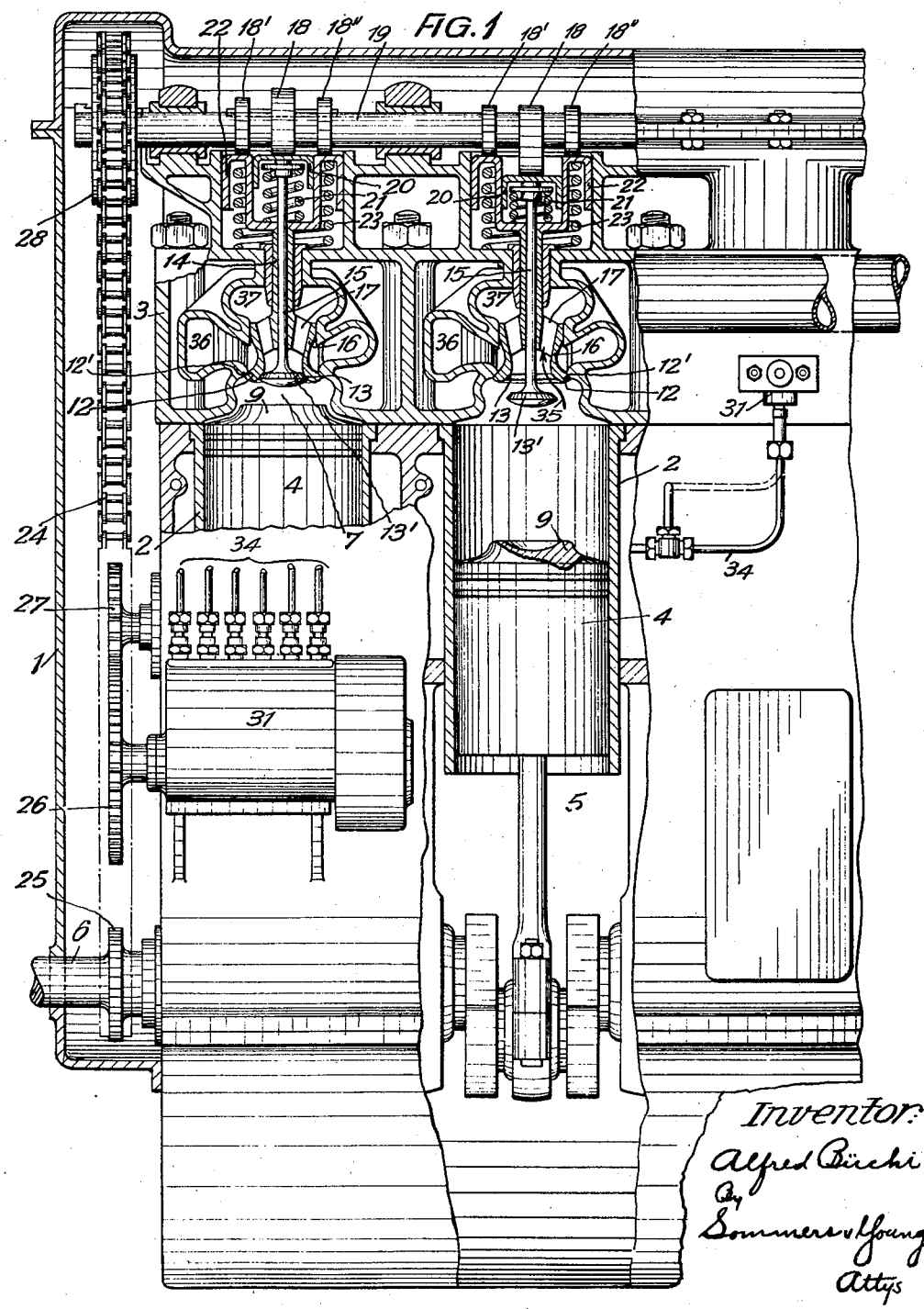

Inventor:
Alfred Büchi
By Sommers & Young
Attys.

Patented Sept. 3, 1940

2,213,202

UNITED STATES PATENT OFFICE 2,213,202

INTERNAL COMBUSTION ENGINE

Alfred Buchi, Winterthur, Switzerland

Application July 8, 1938, Serial No. 218,188
In Switzerland July 11, 1937

7 Claims. (Cl. 123—191)

This invention relates to internal combustion engines more especially to those operating by means of compression ignition and on the four-stroke cycle, and having a combustion chamber which is restricted relative to the cylinder bore.

The invention comprises the arrangement, at the end of the combustion chamber opposite the piston face, of two axially telescoped valves serving for admitting the charge and discharging the exhaust gases respectively.

The restricted combustion chamber is given such a form that by means of these valves in conjunction with the piston, which closes the inner end of the restricted combustion chamber in the outer dead center position, a combustion chamber of elliptical cross section is formed, that is, of ellipsoidal shape, when the valves are closed.

In order to provide a chamber of sufficient size for the valves to open and for the circulation of the gases, the diameter of the restricted combustion chamber maybe larger at its end remote from the piston than at its end adjacent to the piston head. By this provision a circumferential wall is formed round the combustion chamber which extends inwardly and by means of which, when the engine is of the scavenging type, the conduction of the scavenging air from one valve opening to the other is facilitated. Furthermore, the combustion chamber may be so constructed and the cylinder head so shaped that, when the piston assumes the outer dead center, while both valves are open, the inner valve body, that is valve disc extends into close proximity to the corresponding complementary portion of the piston head and a passage similar to an annular space is formed, provided that the walls of the combustion chamber and the valve bodies are appropriately shaped, through which the charge entering through one of the valves is conducted to the other valve by flowing about the outer valve disc and thus filling the whole available clear space in the best possible manner.

The lifts of both valves in their opened position are such, when the piston assumes the outer dead center, and the valve bodies, the inner wall of the restricted combustion chamber, and the surface of the piston head entering this chamber are given such shapes, according to the invention, that flow areas of smooth configuration and approximately constant cross section are formed. The seat of the inner valve is depressed deeply into the outer valve body and the part of the inner valve body projecting beyond this seat into the combustion chamber is rounded to such an extent that the scavenging air passes over smoothly and regularly from one valve opening to the other. This projection on the inner valve body may be convex toward the interior of the cylinder in such manner that, when both valves are simultaneously opened and the charge enters through the outer valve, the portion of the charge reflected by the convexed surface of the projection is diverted toward the cross section of free passage of the exhaust valve with a minimum of loss of energy. To this end the complementary surface of the piston head is advantageously given a shape corresponding to and surrounding the convexed surface of the projection on the exhaust valve body.

The charge can either be admitted through the outer valve and discharged through the annular space between the two valves or vice versa. Moreover, to the entering charge may be imparted a rotative impulse about the valve axis, by means of tangential entrance surface portions or separate guide surfaces, so that a whirling movement is set up in the charge arriving at the combustion chamber after having entered the cylinder. Alternatively, for effecting this rotative impulse the connecting ribs between the inner valve stem guide and the sleeve constituted by the outer valve may be utilised, which to this end are provided with helical surfaces.

By means of the invention economy is space can be obtained by arranging the valves within a restricted combustion chamber facilitating the formation and combustion of the explosive mixture. Above all, a complete scavenging of the combustion chamber is obtained with the aid of this highly efficient energy saving valve and combustion chamber arrangement in engines operating with scavenging. As a result of this altogether symmetrically rotating flow, the whole combustion chamber is positively swept by the scavenging air and perfectly purified from exhaust gas without leaving dead spaces, while at the same time the wall of the combustion chamber are uniformly and effectively cooled.

Embodiments of the invention are illustrated by way of example only in the accompanying drawings, in which Fig. 1 is a sectional side elevation of an internal combustion engine according to the invention;

Fig. 2 is a cross section taken through the upper part of Fig. 1;

Figs. 3 and 4 are sectional views of the valve and combustion chamber arrangements, inclusive of the admission and exhaust valves, at different times in the cycle of operation;

Fig. 5 is a sectional view in perspective of the valves of a cylinder of a different embodiment of the invention;

Figure 6:
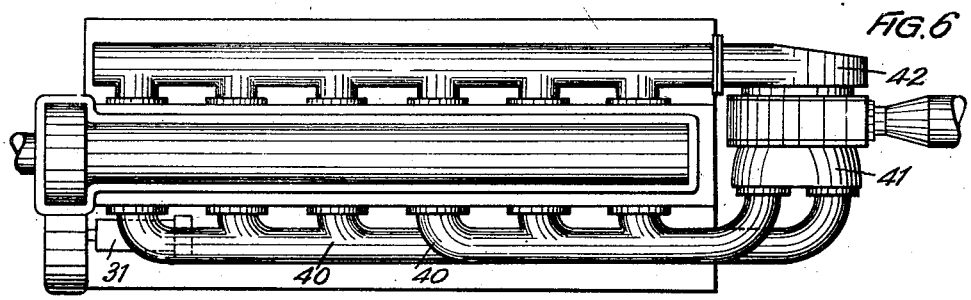
Fig. 6 is a top plan view of the assembled parts of an internal combustion engine according to the invention, as seen from one side thereof.

Referring to Fig. 1, the numeral 2 designates the cylinder, whereas 3 denotes the cylinder head of the internal combustion engine. The working piston 4 drives the crank shaft 6 by means of the connecting rod 5 in a manner known per se. The piston 4 of the left-hand cylinder is shown at its outer dead center position. The form of the combustion chamber 7 is similar to that of a relatively thin disc of a smaller diameter than the bore of the cylinder. The diameter of the upper portion of the combustion chamber is larger than that of the lower portion. The lower limit of the combustion chamber is defined toward the piston 4 by a projection 9 on the outer end of the piston extending thereinto. The combustion chamber 7 is closed above by the valve discs 12', 13' of two telescoped valves 12, 13 which are substantially coaxial with the combustion chamber 7 as well as with the cylinder 2. The outer valve 12 has a tubular stem 14 which surrounds the stem 15 of the inner valve 13 for guiding the same. A sleeve 16 formed on the outer valve 12 is fastened to the stem 14 of the latter by connecting ribs 17.

The control of the valve 13 is effected in the embodiment shown in Figs. 1 and 2 by a cam 18 on an overlying cam shaft 19 engaging with a plunger 20 through the intermediary of the valve stem 15 and a compression spring 21 acting thereon. The control of the valve 12 is effected by two cams 18', 18" which engage with a double sleeve 22 which slidably guides the plunger 20 and is acted upon by a compression spring 23 abutting with its other end against the cylinder head 3 and to the underside of a lower diaphragm of which the valve stem 14 is connected, the upper side of this diaphragm serving as an abutment for the spring 21. The cam shaft 19 is driven by the crank shaft 6 by means of a chain drive including a driving chain 24 and chain wheels 25 to 28. The driving chain 24 further drives a fuel pump 31 which supplies the fuel to fuel nozzles 32, 33 of the individual engine cylinders 2 through connecting piping 34.

From Fig. 2, which represents a section through the axis of the left hand cylinder of Fig. 1 at right angles to the plane of this figure, it is evident how the cams 18 on the one hand and 18', 18" on the other act on the valve discs 12', 13' of the valves 12, 13 respectively against the action of the springs 21 and 23.

In Figs. 1 and 3 to 5 several different relative positions of different valves 12, 13 are shown. Fig. 3 represents the positions of the parts at the time at which scavenging of the combustion chamber 7 takes place. The piston 4 is at the outer dead center. Both valves 12 and 13 are opened. The valve disc 13' of the inner valve 13 extends into a recess in the projection 9 of the piston, which recess is provided with a surface mating the underside of the valve disc 13' of valve 13. The charge which enters, by way of example, through passage 36 flows through the annular space between the sleeve 16 of the outer valve 12 and the shell of the cylinder head 3 into the combustion chamber 7, then sweeps past the valve disc 12' of the valve 12 and is so diverted by the valve disc 13' of the inner valve 13 that the scavenging air present in the annular space between the sleeve 16 of the valve 12 and the valve 13 escapes toward the passage 37. The lifts effected by the admission valve 5 and the exhaust valve during the scavenging period, when the piston assumes the outer dead center, the form of the valve bodies, the inner wall of the restricted combustion chamber as well as that of the piston end projecting into the same are so chosen that for the scavenging air then flowing through the valve openings and the combustion chamber through-areas of smooth configuration and of substantially constant cross section are formed.

The valve seat for the valve disc 13' is located so far inwardly in the valve body 12' and the portion of this valve disc projecting beyond this seat into the combustion chamber is rounded to such an extent that the charge and the scavenging air admitted are diverted smoothly and regularly. The projection on the valve disc 13' is convexed downwardly to such an extent that, as long as there is clearance between the valve disc 13' and the cavity in the projection 9 on the piston head, the exhaust gases and scavenging air flowing from below upwardly are diverted toward the opening of the valve 13 more directly, by this measure. The cavity in the projection 9 on the piston end provides a counter mating surface for the outer surface of the projection of the valve disc 13'.

The clearance spaces 38, 39 between the projection 9 on the one hand, and the valve body 13' and the cylinder head 3 on the other, are made as small as possible, so that practically the whole combustion chamber is swept by the streams of charging and scavenging air.

Fig. 4 shows the position of the valve bodies during the admission stroke of the machine in connection with which the valve 12 serves as admission valve and the valve 13 as exhaust valve. The disc 13' of the valve 13 seats on the disc 12' of the valve 12 which in turn is open. The charge passes through the passage exteriorly of the disc 12' into the combustion chamber 7 and the cylinder 2.

The right hand cylinder in Fig. 1 illustrates the condition of the valve bodies during the exhaust stroke. The outer valve 12 remains closed while only the inner valve 13 is open. The exhaust gases are discharged through the space between the valve body 13' and the inner surface of the valve body 12', in the direction of arrow 35.

In Fig. 5, the valves 12, 13 are shown in a perspective view. For the purposes of illustration one quarter of the sleeve 16 of the outer valve 12 is shown broken out. Contrary to the embodiment illustrated in Figs. 1–4, the charge enters this valve arrangement through an upper passage 36', and the annular space interiorly of the outer valve 12. The connecting ribs 17' which interconnect the sleeve 16 of the outer valve 12 with the stem 14 thereof, are provided with helical surfaces in consequence of which the entering charge is imparted a rotational movement about the valve axis. Both valves 12, 13 are shown in open condition representing the scavenging period. The exhaust gases are discharged exteriorly of the valve body 12' into lateral passages 37'.

Fig. 6 represents a top plan view of a six cylinder internal combustion engine according to the invention associated with an exhaust gas turbine driven compressor for precompressing the charge. The exhaust gases are collected from all the cylinders and supplied to the exhaust gas turbine 41 by means of conduits 40. This turgine drives the rotor of a blower 42 of the machine.

Figure 7:
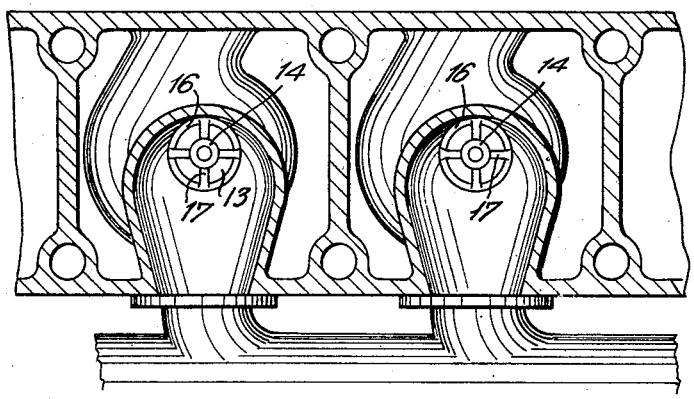
Figs. 7 and 8 are different horizontal sections of part of Fig. 6 on enlarged scale.

Fig. 7 which is a horizontal section taken through the cylinder head 3 at the level of the exhaust passage 37 of Fig. 1 shows the valve 12 in top plan view. The ribs 17 which connect the valve sleeve 16 with the valve stem 14 are plainly visible.

Figure 8:
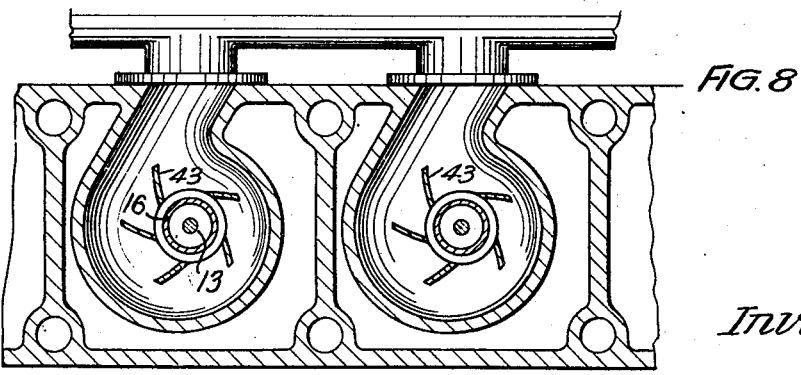

Fig. 8 shows a horizontal section taken at a somewhat lower level than Fig. 7 through the admission passage 36. In order to set up a rotational movement in the entering charge the passage 36 is reduced toward the admission valve in spiral shape. In addition, the charge is conducted tangentially toward this valve by means of ribs 43.

Various changes and modifications may be made in the practice of my invention without departing from the principle or spirit thereof, by adding customary practice and established knowledge of the art to the present disclosure and the scope of the appended claims is not to be regarded as limited except as specified therein.

I claim:

1. In an internal combustion engine, a cylinder, a piston guided in said cylinder, means forming a combustion chamber of a substantially elliptical vertical cross section with the major axis of said section extending transversely to the axis of said cylinder, thereby forming an enlarged chamber portion having a sharply curved circumferential wall, said chamber being restricted relative to the bore of said cylinder and opening with its inner end toward said bore, surface configurations on the outer end of said piston closing the inner end of said restricted combustion chamber when the piston is at its outer dead center position, valve means for admission of charging air into said combustion chamber, and valve means for exhausting the exhaust gases therefrom, said admission and exhaust valve means being axially telescoped and closing the outer end of said chamber portion uniformly all around while closed, and while said admission valve is open, with said piston in said outer dead center position, directing the air entering the combustion chamber uniformly over said wall for efficiently cooling said wall.

2. In an internal combustion engine adapted to be scavenged by passing air through its clearance space when the piston thereof is substantially at its outer dead center position, a cylinder, a piston guided in said cylinder, means forming a combustion chamber of a substantially elliptical cross section restricted relative to the bore of said cylinder, and opening with its inner end toward said bore, surface configurations on the outer end of said piston entering said chamber and closing the inner end thereof when the piston is at its outer dead center position during the scavenging period, valve means for admission of an air charge and for scavenging the said combustion chamber and valve means for exhausting the exhaust gases therefrom, said valve means including admission and exhaust valve bodies cooperating with correlated valve openings, said valve bodies being an axially telescoped relation, said valve means closing the outer end of said chamber while closed, and the shapes of said valve bodies, the inner wall of the restricted combustion chamber, and the surface configurations of the piston forming smooth flow areas of substantially constant cross section for the scavenging air flowing through said valve openings, and said combustion chamber during the periods provided by the lifts of said valve means.

3. In an internal combustion engine adapted to be scavenged by passing air through its clearance space when the piston is substantially at its outer dead center position, a cylinder, a piston guided in said cylinder, means forming a combustion chamber having a substantially elliptical cross section restricted relative to the bore of said cylinder, and opening with its inner end toward said bore, surface configurations on the outer end of said piston, closing the inner end of said restricted combustion chamber when said piston is at its outer dead center position, valve means including admission and exhaust valve bodies and correlated valve seats, said admission and exhaust valves being in axially telescoped relation for admission of an air charge and for scavenging the said combustion chamber, said valve means limiting the outer end of said chamber while closed, a rounded projection on said inner valve body, said inner valve seat being depressed so far inwardly in said outer valve body relative to the outer end of said piston and behind said projection that in the open condition of both of said valves the charge and scavenging air are diverted smoothly and regularly from one valve opening to the other.

4. In an internal combustion engine adapted to be scavenged by passing air through its clearance space when the piston is in its outer dead center position, a cylinder, a piston guided in said cylinder, a cylinder head having a shell, walls forming a combustion chamber having a substantially elliptical cross section restricted relative to the bore of said cylinder and opening with its inner end toward said bore, surface configurations on the outer end of said piston closing the inner end of said restricted combustion chamber, when the piston is in its outer dead center position, admission and exhaust valve means for said cylinder having telescoped valve bodies for admission of charging air and air for scavenging the combustion chamber and for exhausting the scavenging air and exhaust gases therefrom, said bodies limiting the outer end of the combustion chamber end while shut, and the outer body, when open, forming with the shell of the combustion chamber an annular space, whereby when said piston is substantially at its outer dead center position and said inner valve body closely approaches the mating piston end surface, the charge arriving through one valve is diverted about said outer body to flow from one valve opening to the other throughout substantially the whole available clear space therebetween.

5. In an internal combustion engine adapted to be scavenged by passing air through the clearance space when the piston is substantially in its outer dead center position, a cylinder, a piston guided in said cylinder, means forming a combustion chamber of a substantially elliptical vertitical cross section with the major axis of said section extending transversely to the axis of said cylinder, thereby forming an enlarged chamber portion having a sharply curved circumferential wall, said chamber being of smaller transverse diameter than the bore of said cylinder and opening with its inner end toward said bore, surface configurations on the outer end of said piston closing the inner end of said smaller combustion chamber when the piston is at its outer dead center position, air guide ribs arranged tangentially of said chamber portion in advance thereof, valve means for admission of charging air and air for scavenging said combustion chamber and valve means for exhausting the exhaust gases therefrom, said admission and exhaust valve means being axially telescoped and closing the outer end of said chamber portion uniformly all around while closed, and, while open with said piston at said dead center position, leading the scavenging air passing through said valves tangentially onto said wall uniformly throughout its circumference for efficiently cooling said wall.

6. In an internal combustion engine adapted to be scavenged by passing air through the clearance space when the piston is substantially in its outer dead center position, a cylinder, a piston guided in said cylinder, means forming a combustion chamber of a substantially elliptical vertical cross section with the major axis of the ellipse extending transversely to the axis of said cylinder, thereby forming an enlarged chamber portion having a sharply curved circumferential wall, said chamber being restricted relative to the bore of said cylinder and opening with its inner end toward said bore, surface configurations on the outer end of said piston closing the inner end of said restricted combustion chamber when the piston is at its outer dead center position, valve means for admission of charging and scavenging air to said combustion chamber in a uniform helical flow and valve means for exhausting the exhaust gases and scavenging air therefrom, said admission and exhaust valve means being located interiorly of the chamber and the seat of said exhaust valve merging with the curvature of said chamber wall and closing the outer end of said chamber portion uniformly all around, and while open when said piston is at said outer dead center position, leading the scavenging air from said inner admission valve means to the exhaust valve means in a helical flow over said wall in close contact therewith up to said valve seat for efficiently cooling said wall uniformly throughout.

7. In an internal combustion engine adapted to be scavenged by passing air through the clearance space when the piston is substantially in its outer dead center position, a cylinder, a piston guided in said cylinder, means forming a combustion chamber of a substantially elliptical vertical cross section with the major axis of the ellipse extending transversely to the axis of said cylinder, thereby forming an enlarged chamber portion having a sharply curved circumferential wall, said chamber being restricted relative to the bore of said cylinder and opening with its inner end toward said bore, surface configurations on the outer end of said piston closing the inner end of said restricted combustion chamber when the piston is at its outer dead center position, valve means for admission of charging and scavenging air to said combustion chamber in a uniform helical flow, and valve means for exhausting the exhaust gases and scavenging air therefrom, said admission and exhaust valve means being located interiorly of the chamber, and the seat of said admission valve merging with the curvature of said chamber wall and closing the outer end of said chamber portion uniformly all around, and while open when said piston is at said outer dead center position, leading the scavenging air from said outer admission valve means to said inner exhaust valve means in a helical flow over said wall in close contact therewith starting from said outer admission valve seat for efficiently cooling said wall uniformly throughout.

ALFRED BUCHI.